US006801660B1

(12) United States Patent
Williamson et al.

(10) Patent No.: US 6,801,660 B1
(45) Date of Patent: Oct. 5, 2004

(54) METHOD AND SYSTEM FOR MAINTAINING ALTERNATES IN ASSOCIATION WITH RECOGNIZED WORDS

(75) Inventors: Peter H. Williamson, Kirkland, WA (US); Dan W. Altman, Kirkland, WA (US); Charlton E. Lui, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 371 days.

(21) Appl. No.: 09/643,414

(22) Filed: Aug. 22, 2000

(51) Int. Cl.[7] .................................................. G06K 9/00
(52) U.S. Cl. ...................................... 382/187; 382/229
(58) Field of Search ........................ 382/181, 186–189, 382/202, 229, 231, 309–311; 704/10; 707/9; 715/530, 532, 533

(56) References Cited

U.S. PATENT DOCUMENTS

| | | | | | |
|---|---|---|---|---|---|
| 5,594,640 | A | * | 1/1997 | Capps et al. ................ | 715/532 |
| 5,615,285 | A | | 3/1997 | Beernink .................... | 382/189 |
| 5,675,665 | A | | 10/1997 | Lyon .......................... | 382/229 |
| 5,682,439 | A | * | 10/1997 | Beernink et al. ........... | 382/187 |
| 5,710,916 | A | | 1/1998 | Barbaraet et al. ............. | 707/9 |
| 5,764,799 | A | | 6/1998 | Hong et al. ................. | 382/225 |
| 5,812,697 | A | | 9/1998 | Sakai et al. ................. | 382/186 |
| 5,828,991 | A | * | 10/1998 | Skiena et al. ................. | 704/9 |
| 5,855,000 | A | | 12/1998 | Waibel et al. .............. | 704/235 |
| 5,857,099 | A | | 1/1999 | Mitchell et al. ............ | 704/235 |
| 5,953,451 | A | | 9/1999 | Syeda-Mahmood ......... | 382/187 |
| 5,960,447 | A | * | 9/1999 | Holt et al. ................... | 715/500 |
| 5,995,664 | A | | 11/1999 | Shimomura ................. | 382/229 |
| 6,005,973 | A | | 12/1999 | Seybold et al. ............. | 382/187 |
| 6,014,460 | A | | 1/2000 | Fukushima et al. ......... | 382/177 |
| 6,041,141 | A | | 3/2000 | Yamamoto et al. ......... | 382/231 |
| 6,111,985 | A | | 8/2000 | Hullender et al. | |

(List continued on next page.)

FOREIGN PATENT DOCUMENTS

JP 07110845 4/1995

OTHER PUBLICATIONS

Senda et al. "Document Image Retrieval System Using Character Candidates Generated by Character Recognition Process." Proc. Of the 2nd Int. Conf. on Document Analysis and Recognition, Oct. 20, 1993, pp. 541–546.
Carrano. Data Abstraction and Problem Solving with C++; Walls and Mirrors. The Benjamin/Cummings Publishing Company, Inc,. 1995, pp. 150–163, 175–176, 179–180.
Morita et al. "A Fast and Compact Data Structure of Storing Multi–Attribute Relations Among Words." IEEE In Conf. on Systems, Man and Cybernetics, vol. 3, Oct. 11, 1998, pp. 2791–2796.

(List continued on next page.)

*Primary Examiner*—Daniel Mariam
(74) *Attorney, Agent, or Firm*—Law Offices of Albert S. Michalik, PLLC (57) ABSTRACT

In a computing device that receives handwritten data, a method and system that maintains an association between alternates for a given ink word, regardless of the handwritten or text state of the word, and regardless of the position of the word as it may be edited in a document. Handwritten data is maintained in an ink word data structure, and once the word is recognized and an alternate is selected for it, the first character of the word remains as an ink word (in a text buffer) pointing to the data structure, with a flag set in the data structure indicating that the word is now recognized as text. In this state, the first character is displayed to the user as a recognized text letter instead of as the handwritten word. The other characters that make up the recognized word are inserted as text into the text buffer. Any alternates returned by the recognizer are thus stored with the ink word data structure displayed as this first character of a recognized word, which also maintains the ink data, e.g., the stroke information entered by a user or the like. Then, if the user edits the word, e.g., moves it, the alternates and also the ink data move with the word. Other alternatives for associating the alternates with the recognized text are also described.

31 Claims, 9 Drawing Sheets

U.S. PATENT DOCUMENTS

| | | |
|---|---|---|
| 6,473,517 B1 | 10/2002 | Tyan et al. .................. 382/105 |
| 6,493,464 B1 | 12/2002 | Hawkins et al. ............ 382/189 |
| 2002/0013795 A1 | 1/2002 | Dresevie et al. |
| 2002/0049796 A1 | 4/2002 | Dresevie et al. |

OTHER PUBLICATIONS

Arica et al. "A New Scheme for Off–Line Handwritten Connected Digit Recognition." Proc. KES '98, $2^{nd}$ Int. Conf. on Knowledge–Based Intelligent Electronics Systems, vol. 2, Apr. 21, 1998, pp. 329–335.

Jung et al. Machine Printed Character Segementation Method Using Side Profiles. Proc. SMC '99, IEE Int. Conf. on Systems, Man, and Cybernetics, vol. 6, Oct. 12, 1999, pp. 863–867.

Liang et al. "Efficient Algorithms for Segmentation and Recognition of Printed Characters in Document Processing." IEEE Pacific Rim Conf. on Communications, Computers and Signal Processing, vol. 1, May 19, 1993, pp.240–243.

Lee et al. "A New Methodology for Gray–Scale Character Segmentation and Recognition." Proc. Of the $3^{rd}$ Int. Conf. on Document Analysis and Recognition, vol. 1, Aug. 14, 1995, pp. 524–527.

Ariki et al., "Segmentation and Recognition of Handwritten Characters Using Subspace Method." Proc. Of the $3^{rd}$ Int. Conf. on Document Analysis and Recognition, vol. 1, Aug. 14, 1995, pp 120–123.

Zhao et al. "New Method for Segmenting Unconstrained Handwritten Numeral String." Proc. Of the $4^{th}$ Int. Conf. on Document Analysis and Recognition, vol. 2, Aug. 18, 1997, pp. 524–527.

* cited by examiner

METHOD AND SYSTEM FOR MAINTAINING ALTERNATES IN ASSOCIATION WITH RECOGNIZED WORDS

FIELD OF THE INVENTION

The present invention relates generally to computer devices, and more particularly computer devices arranged to receive handwritten input.

BACKGROUND OF THE INVENTION

Contemporary computing devices allow users to enter handwritten words (e.g., in cursive handwriting and/or printed handwritten characters) and symbols (e.g., a character in Far East languages). The words and symbols can be used as is, e.g., to function as readable notes and so forth, or can be converted to text for more conventional computer uses. To convert to text, for example, as a user writes strokes representing words or other symbols onto a touch-sensitive computer screen or the like, a handwriting recognizer (e.g., trained with millions of samples, employing a dictionary, context and other rules) is able to convert the handwriting data into dictionary words or symbols. In this manner, users are able to enter textual data without necessarily needing a keyboard.

Contemporary handwriting recognizers are not one hundred percent accurate in recognizing words. Because of this, one type of recognizer returns a list of alternates, ranked according to probability by the recognizer. Via a user interface, systems may provide a list of these alternates, from which the user can select a different word instead of the word the recognizer initially guessed as the one that the user most likely intended.

However, words in a word processing system are often edited, including moving around the words, having letters therein deleted, inserted, replaced with others, and so forth. Also, selected words may be toggled between handwritten data that the user entered and a recognized (e.g., text) state. An efficient, robust and flexible mechanism for maintaining the alternates in association with the word that does not lose the alternates as words are edited or undergo state changes is needed.

SUMMARY OF THE INVENTION

Briefly, the present invention provides a mechanism that maintains an association between alternates for a given ink word, regardless of the handwritten or text state of the word, and regardless of the position of the word as it may be edited in a document.

In one implementation, handwritten data is maintained in an ink word data structure. Once the word is recognized and an alternate is selected for it, (converted to text), the first character of the word remains as an ink word (in a text buffer) pointing to the data structure, with a Show Recognized flag (tsShowRecognized) set in the data structure indicating that the word is now recognized as text. In this state, the first character is displayed to the user as a recognized text letter instead of as the handwritten word. The other characters that make up the recognized word are inserted as text into the text buffer. Any alternates returned by the recognizer are thus stored (directly or indirectly via a pointer) with the ink word data structure displayed as this first character of a recognized word, which also maintains the ink data, e.g., the stroke information entered by a user or the like. Then, if the user edits the word, e.g., moves it, the alternates and also the ink data move with the word. In one implementation, the alternates and stroke data are lost if the user deletes the first character of the recognized word. In an alternative implementation, this data effectively can be moved to another, remaining character in the word.

Other alternatives include maintaining an invisible text element or token that points to the original ink word and remains associated with the full text of the word, e.g., the token (before, within or after the word) moves with the word. In another alternative, the recognized word can have the first character placed in the text buffer along with the other recognized characters, with the pointer to the ink word data remaining in the text buffer in association with the recognized word, but the ink word data structure having a flag set therein indicating that it should be considered hidden. Another alternative mechanism maintains the entire recognized text word in an ink word data structure. In this alternative, the word processing/editing software is modified to edit the words within the ink word data structure. Yet another possible alternative includes maintaining a separate data structure comprising a table or the like that associates the location of characters in a text buffer with a separately maintained list of alternates. Note that one problem with these alternatives is that existing word/ink processing code may need to be modified.

Other advantages will become apparent from the following detailed description when taken in conjunction with the drawings, in which:

DETAILED DESCRIPTION

Exemplary Operating Environment

Figure 1:
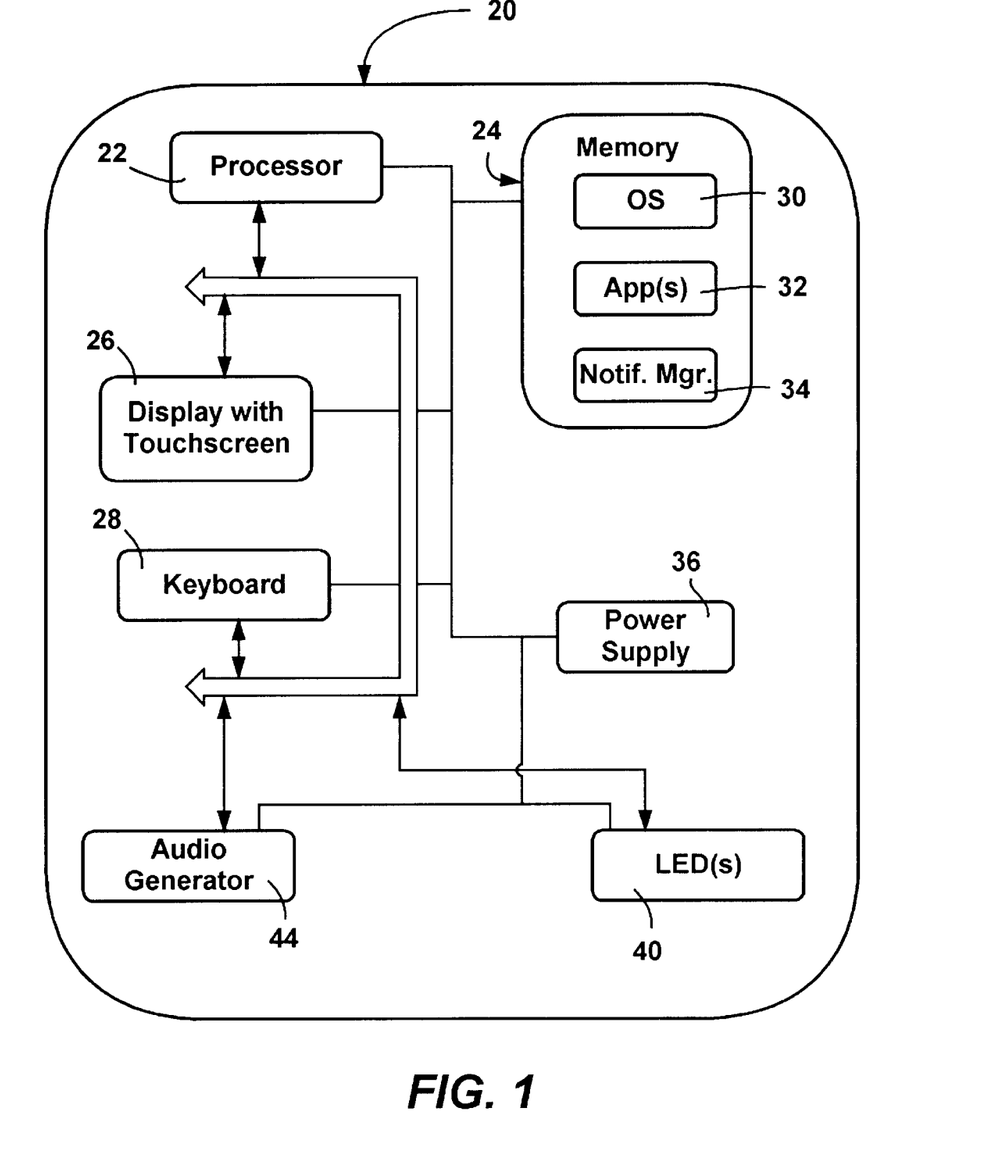
FIG. 1 is a block diagram representing one exemplary computer system into which the present invention may be incorporated.

FIG. 1 illustrates an example of a suitable operating environment 20 in which the invention may be implemented. The operating environment 20 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include routines, programs, objects, components, data structures and so forth that perform particular tasks or implement particular abstract data types. Typically the functionality of the program modules may be combined or distributed as desired in various embodiments.

Computing device 20 typically includes at least some form of computer readable media. Computer-readable media can be any available media that can be accessed by the computing device 20. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the computing device 20. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

FIG. 1 shows functional components of one such handheld computing device 20, including a processor 22, a memory 24, a display 26, and a keyboard 28 (which may be a physical or virtual keyboard). The memory 24 generally includes both volatile memory (e.g., RAM) and non-volatile memory (e.g., ROM, PCMCIA cards, and so forth). An operating system 30 is resident in the memory 24 and executes on the processor 22. The handheld personal computer 20 includes an operating system, such as the Windows® CE operating system from Microsoft® Corporation or other operating system.

One or more application programs 32 are loaded into memory 24 and run on the operating system 30. Examples of applications include email programs, scheduling programs, PIM (personal information management) programs, word processing programs, spreadsheet programs, Internet browser programs, and so forth. The handheld personal computer 20 may also include a notification manager 34 loaded in the memory 24, which executes on the processor 22. The notification manager 34 handles notification requests, e.g., from the application programs 32.

The handheld personal computer 20 has a power supply 36, which is implemented as one or more batteries. The power supply 36 may further include an external power source that overrides or recharges the built-in batteries, such as an AC adapter or a powered docking cradle.

The exemplary handheld personal computer 20 represented in FIG. 1 is shown with three types of external notification mechanisms: one or more light emitting diodes (LEDs) 40 and an audio generator 44. These devices may be directly coupled to the power supply 36, so that when activated, they remain on for a duration dictated by a notification mechanism even though the handheld personal computer processor 22 and other components might shut down to conserve battery power. The LED 40 preferably remains on indefinitely until the user takes action. Note that contemporary versions of the audio generator 44 use too much power for today's handheld personal computer batteries, and so it is configured to turn off when the rest of the system does or at some finite duration after activation.

Maintaining Alternates

Figure 2:
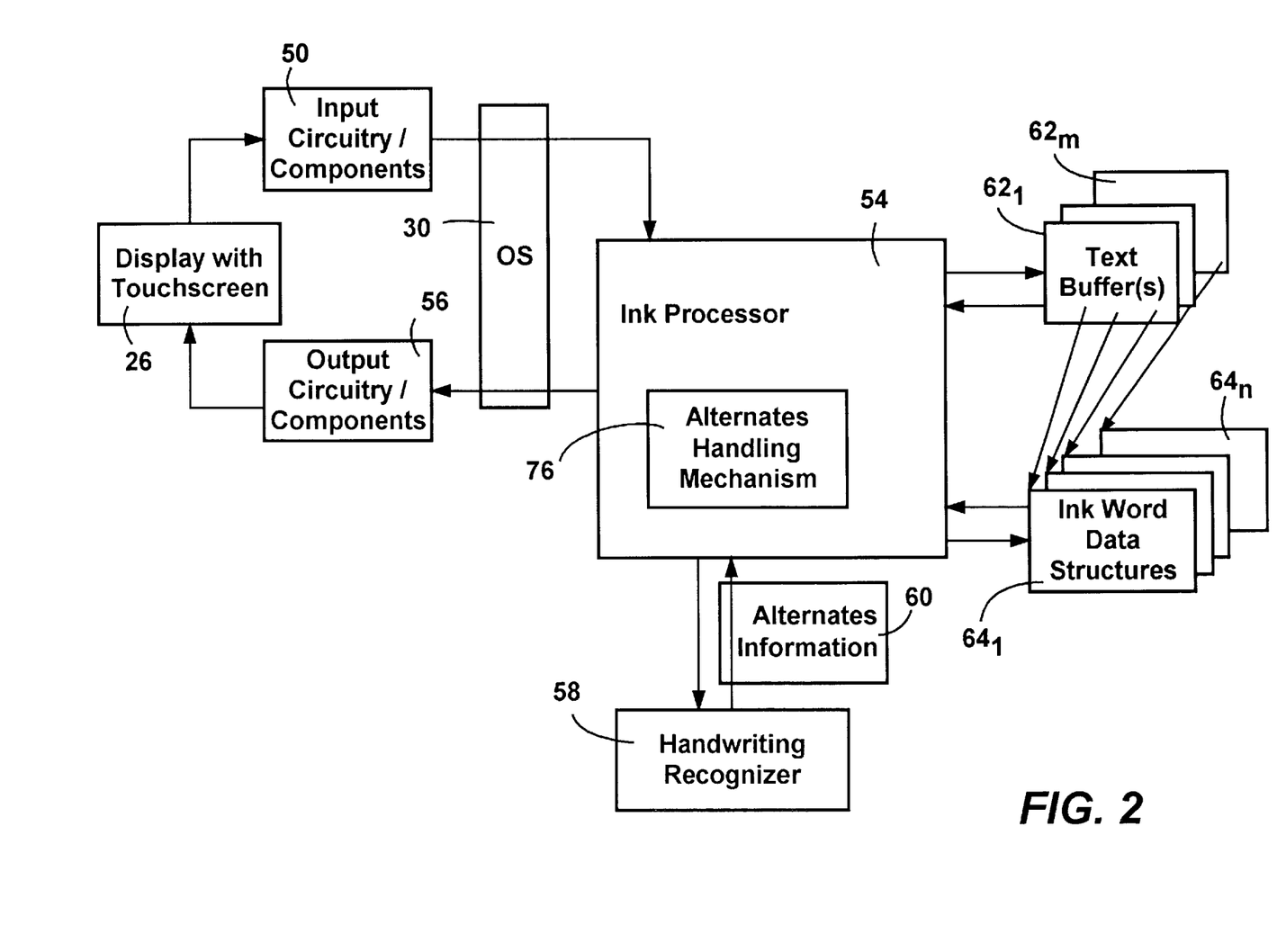
FIG. 2 is a block diagram generally representing components and data structures for handling electronic ink handwritten into a computer system and capable of implementing the present invention.

FIG. 2 represents general components and data structures of the computing system 20 when configured for handwriting recognition in accordance with one aspect of the present invention. In FIG. 2, as a user enters data such as by typing or by handwriting data on the touch screen display 26, input circuitry and/or other components 50 pass the information to the operating system 30. Depending on the state of the system and/or where the screen is contacted, the user input may be converted to text by the operating system or treated as handwritten data. For example, when the screen has a representation of a keyboard displayed thereon and that keyboard is touched, the coordinates may be converted to an ASCII or Unicode character, or an editing command, and sent to an appropriate component (e.g. word processor) to use. Alternatively, if the user is writing in a handwriting input area, the input circuitry 50/operating system 32 passes the data to an ink processor component 54 to process and otherwise handle the electronic ink data. Note that a user may enter the handwritten data (electronic ink) in another manner, such as via a tablet connected to a personal computer.

As is understood, the handwritten data may be in the form of coordinates, and may include other information, e.g., pressure data, timing data and so forth. The ink processor component 54 may comprise an application program, or alternatively may be a subcomponent of or integrated into the operating system 30. The ink processor 54 may also be arranged to pass characters, (e.g., Unicode), whether typed or recognized from words or symbols, to conventional applications that can only deal with characters. For purposes of the present description, the ink processing component 54 will also perform the operations of a conventional word processor, e.g., handle both recognized text and unrecognized ink, allow the editing of words, both text words and handwritten words, update the display 26 (e.g., to word-wrap, mark or insert text or words, delete words) as appropriate, and so forth.

After some pre-processing, such as described in related copending U.S. Patent Application entitled: "Method and System of Matching Ink Processor and Recognizer Word Breaks,", U.S. patent application Ser. No. 09/643,417 filed concurrently herewith and hereby incorporated by reference, the ink processor 54 passes ink data (e.g., one line as entered by a user) corresponding to words or symbols to a recognizer 58 for recognition thereof. The ink processor 54 may also provide ink feature information. Depending on factors such as the system's processing speed and processor/memory availability and so forth, and/or a user's explicit request for recognition, the data passing and/or recognition may take place in the background or foreground, as appropriate. In keeping with the present invention as described below, the recognizer 58 returns alternates information 60 corresponding to recognized word or words for the ink passed thereto. In general, the alternates information 60 comprises a list of alternate word choices, or simply alternates (sometimes referred to as candidates), for each word recognized by the recognizer 58 for a given set of handwriting data passed thereto. The alternates may be ranked in accordance with probability of correctness, and/or probability information associated with each alternate may be returned in the alternates information 60. For example, a list of alternates may be returned with a highest ranked alternate having a sixty percent probability, the next ranked alternate with a ten percent probability, and so on. The number of returned alternates may be limited to some fixed amount, and/or alternates with very low probabilities may be left off the list. Note that the probability information may be returned on a logarithmic scale instead of in terms of a percentage value. One suitable recognizer is described in U.S. Pat. Nos. 5,313,527 and 5,467,407, hereby incorporated by reference. However, as will be understood, the present invention will operate with any type of recognizer that returns alternates, including a speech recognizer.

As generally represented in FIG. 2, the ink processor 54 maintains one or more text buffers $62_1$-$62_m$. Each text buffer (e.g. $62_1$) is a data structure storing some or all of the contents of a document, such as individual letters, spaces, inked words, and drawings. For example, a text buffer can store the entire contents of a document, or each of a plurality of text buffers can represent one paragraph in a document.

To indicate an inked word, the text buffer (e.g., $62_1$) also contains special codes that indicate the locations of ink words $64_1$-$64_n$ relative to text and other items in the text buffer $62_1$. Each such code is directly followed by a pointer (shown in FIG. 2 via the slanted lines from the text buffers) to the ink word data structure (sometimes referred to as a scrawl) that contains the ink data for that word.

Figure 3:
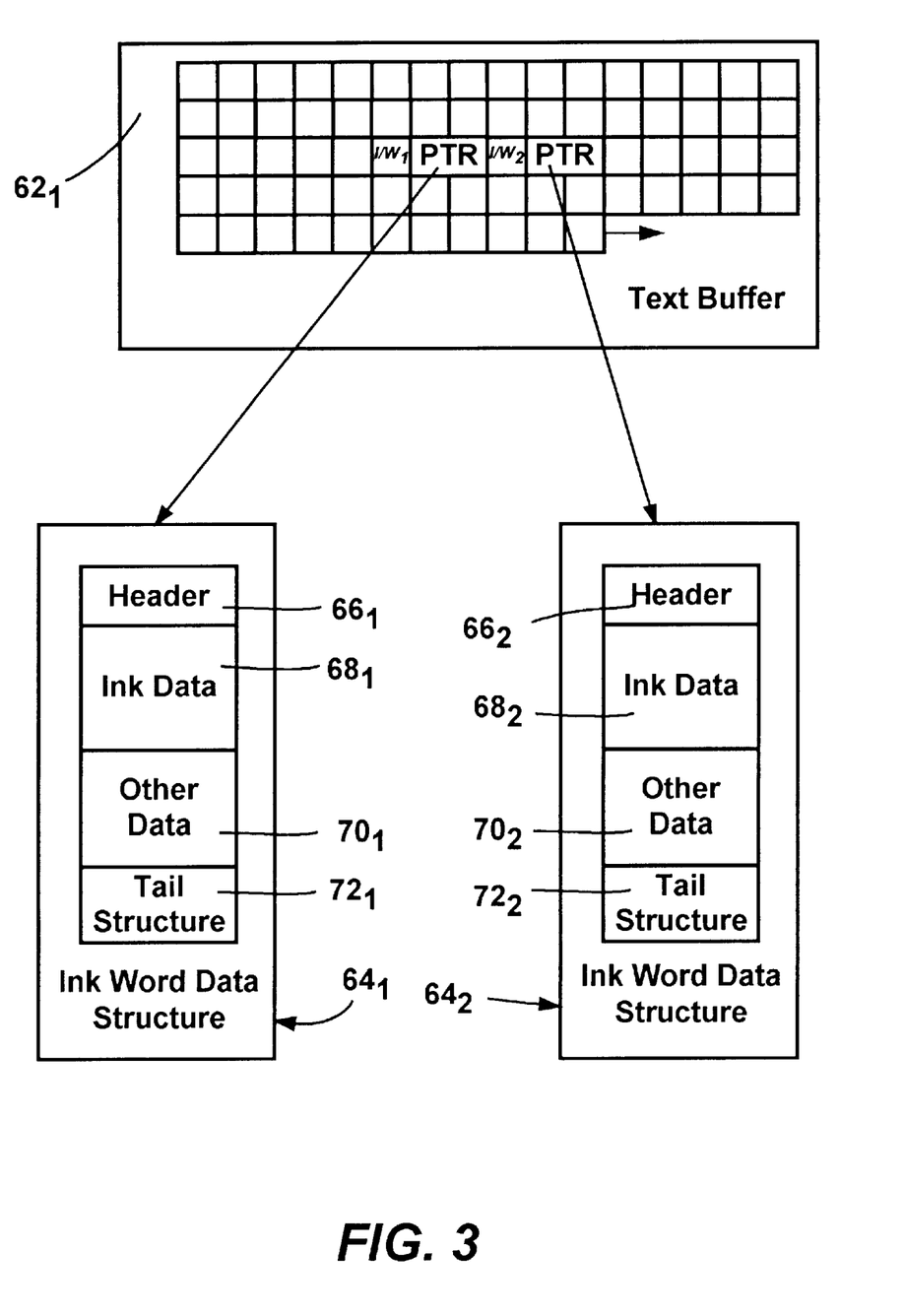
FIG. 3 is a representation of how handwritten data and text data is generally maintained by the ink processor.
Figure 4:
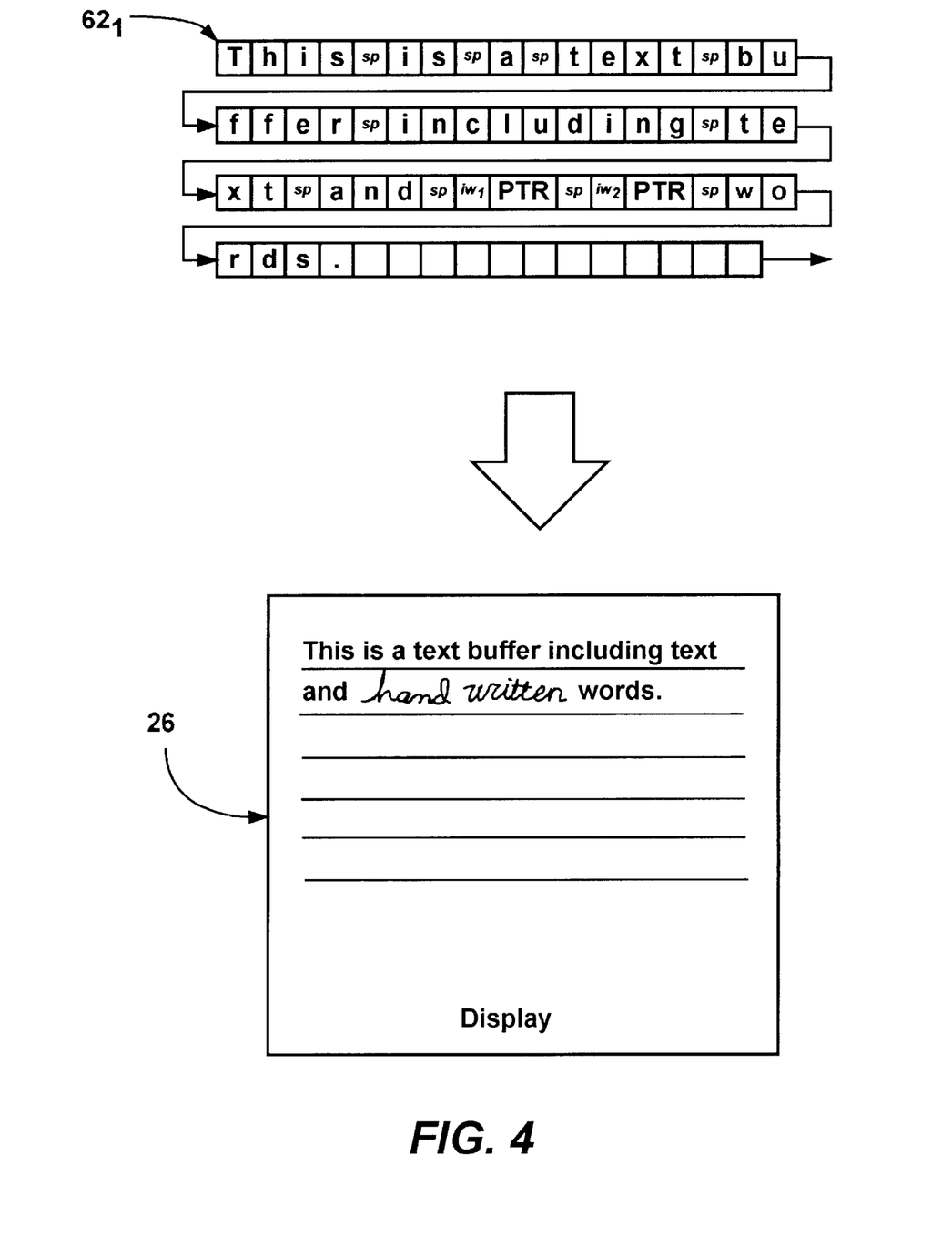
FIG. 4 is a representation of the contents of an example text buffer and how it is displayed to a user.

By way of example, FIG. 3 represents a text buffer (e.g., $62_1$) with memory (e.g., bytes) for text, possibly other items, and special ink word codes ($IW_1$ and $IW_2$), each code followed by its respective pointer to ink words $64_1$-$64_2$. As shown in FIG. 3, the pointers are two bytes in length, but of course pointers of other sizes are feasible. Also, only two ink words are shown, and are consecutive in the text buffer, however any number of ink words may be placed anywhere in a document/text buffer. FIG. 4 shows how the text buffer $62_1$ (shown in FIG. 4 as a linear array) and its ink word data structures $64_1$-$64_2$ may be interpreted by the ink processor to result in a particular display, prior to the two ink words $64_1$-$64_2$ having been converted to their text form.

As generally represented in FIG. 3, each ink word, such as the ink word $64_1$, comprises a data structure having a header 66 which describes the ink data section 68 following it. One of the things tracked in the header 66 is whether an ink word has alternates (i.e., the ink was sent to the recognizer with the alternates information returned therefore) in a Recognized (tsRecognized) flag. In addition to the header field 66 and ink data field 68, other fields are possible, such as an other data field 70 followed by a tail structure field 72 that describes the other field 70. For example, the other field may include the alternates and probability information associated with those alternates as returned by the recognizer 58 following recognition. The maintenance and use of the alternates, and the tail structure, are described below and further described in related copending U.S. patent applications: Ser. No. 09/644,002 entitled "Method and System for Handling the Selection of Alternates for Recognized Words"; Ser. No. 09/643,617 entitled "Method and System for Searching for Words in Ink Word Documents"; and Ser. No. 09/643,997 entitled "Method and System for Extending Ink Word Data Structures while Maintaining Version Compatibility" filed concurrently herewith.

Figure 6:
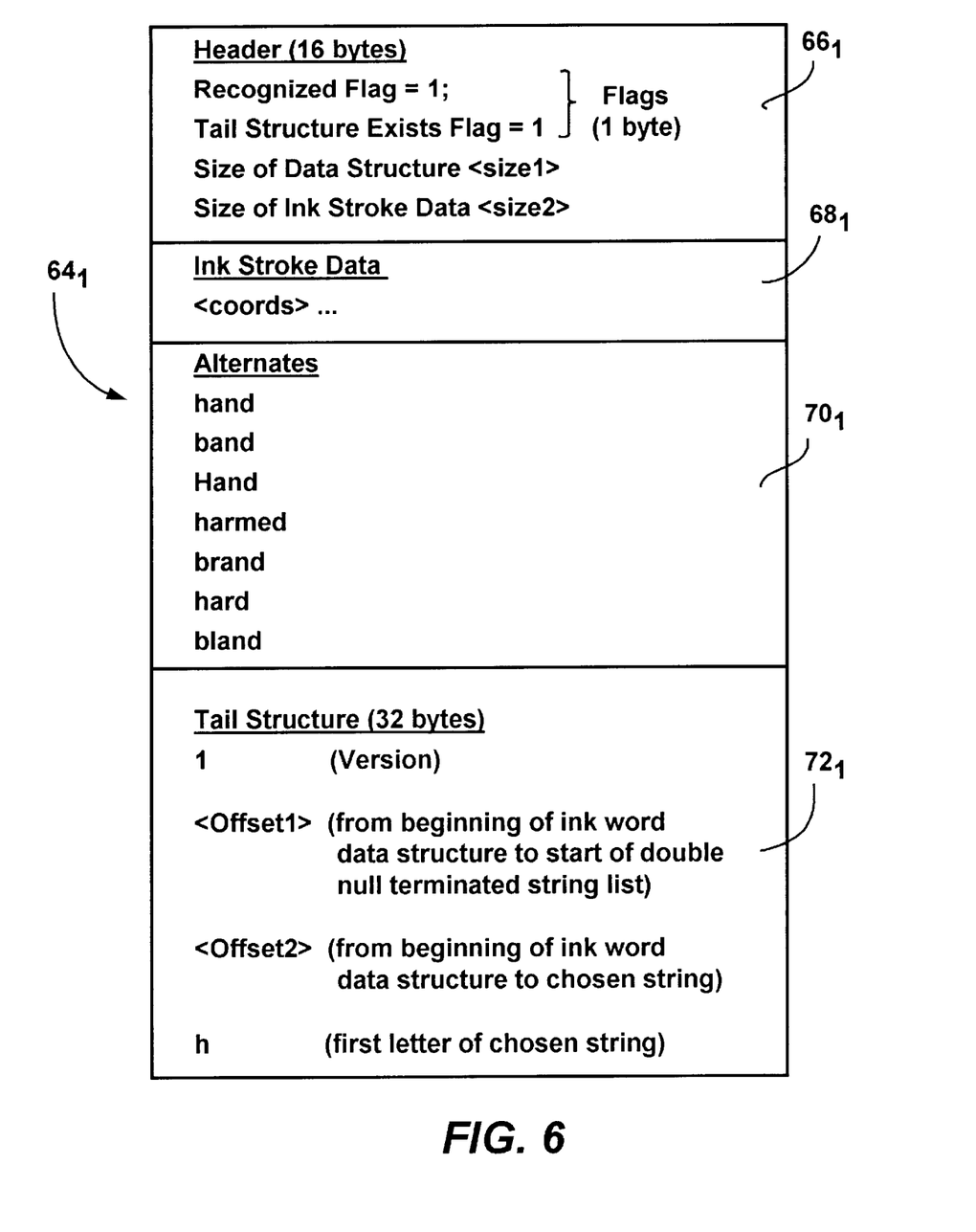
FIG. 6 is a representation of an ink word data structure once the alternates have been returned by a recognizer for an ink word.

The following table sets forth an ink word data structure (scrawl) including the tail structure, (also described below with reference to FIG. 6):

```
// The Ink Word Structure
typedef struct       TXT_SCRAWL
{
    U8               flags;
    U8               candidateChoice;   //index of chosen candidate
                                        //zero based
    INK_STYLE        inkStyle;
    COORD16          width;
    U16              strokeCount;
    U16              bufferSize;
    U8               buffer[2]; //padded for alignment
    // first comes the array of strokes
    //then comes a double null terminated list of strings
    //at the very end is a TXT_SCRAWL_TAIL struct
} TXT_SCRAWL, FAR * P_TEXT_SCRAWL;

// this buffer is appended onto the scrawl to optimize
// getting to strings. For compatibility reasons, it grows
// from the beginning, not the end of the tail structure,
// since a negative addressing scheme from the text scrawl
// end is used to get to its members typedef struct TXT_SCRAWL_TAIL
{
    U32              tailStructVersion;   //starts at 1 and grows
                                          //upwards;
    U32              stringAreaOffset;    //offset from beginning
                                          //of TXT_SCRAWL to the
                                          //start of the double
                                          //null terminated string
                                          //list.
    U32              chosenStringOffset;  //offset from beginning
                                          //of TXT_SCRAWL to the
                                          //chosen string.
    U16              wchFirstXlateChar;   //first char of the
                                          //chosen string.
// ADD ANY NEW MEMBERS AT THE END
} TXT_SCRAWL_TAIL * P_TEXT_SCRAWL_TAIL;
```

For purposes of simplicity herein, the present invention will primarily be described with respect to handwritten cursive words, using the English language for various examples. However, as will be understood, the present invention may operate with printed characters and symbols, and provides numerous benefits regardless of any particular language.

One of the operations performed by the ink word processor 54 is to manage the alternates returned by the recognizer 58. To this end, as generally represented in FIG. 2, the ink processor 54 includes code that serves as an alternates handling mechanism 76. In accordance with one aspect of the present invention, in one preferred embodiment, following recognition of a word, the alternates handling mechanism 76 maintains the alternate information in an ink word data structure (e.g., $64_1$) of the text buffer e.g., $62_2$. Once a word has an alternate selected, the ink word data structure is displayed as the first letter of the selected alternate, with any remaining letters being inserted as text into the text buffer.

Figure 5:
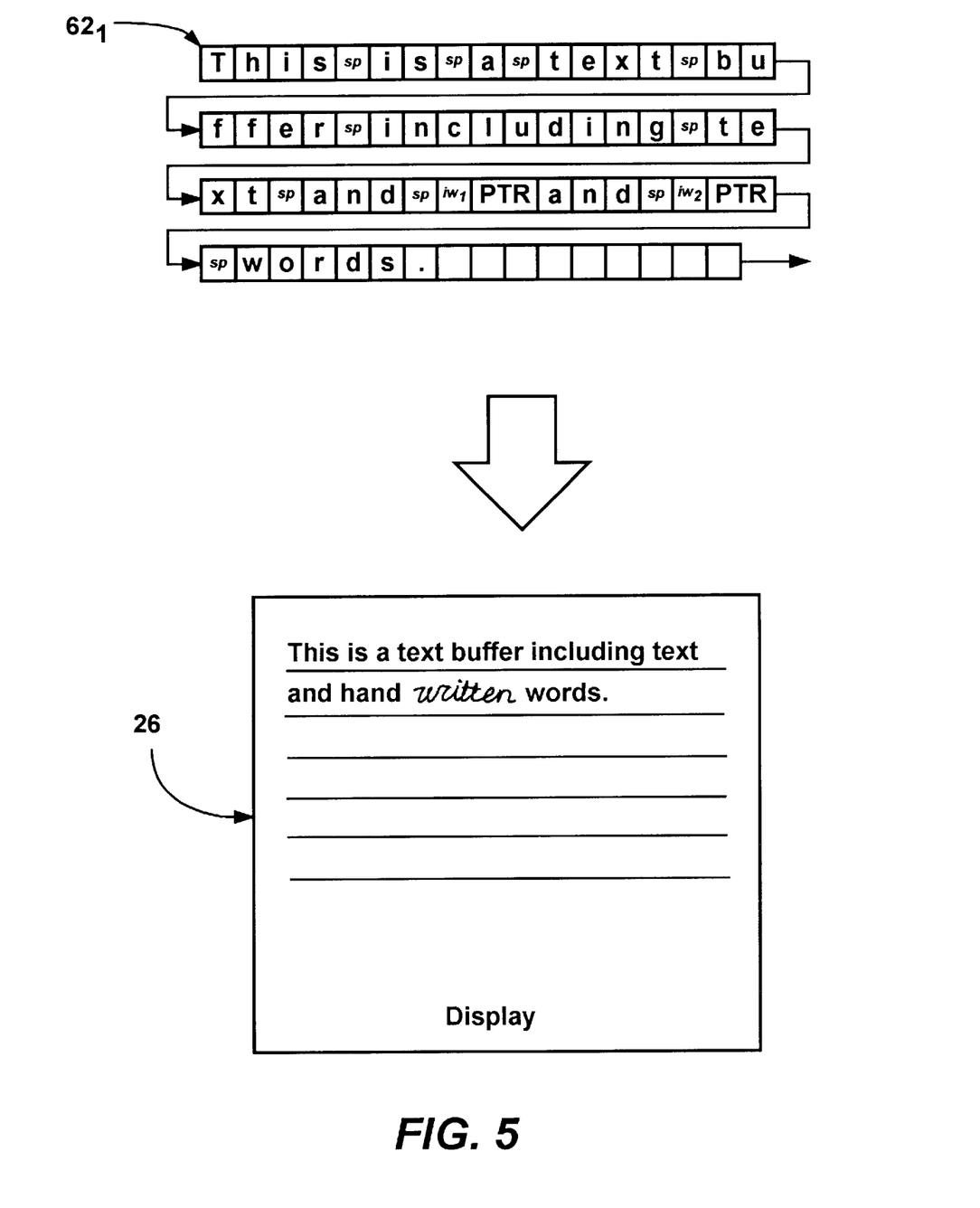
FIG. 5 is a representation of the contents of the example text buffer of FIG. 4 as modified once an ink word has been converted to text.

FIGS. 4 and 5 shows how this is accomplished by manipulating the text buffer 62$_2$, while FIG. 6 shows how the information is added to the ink word data structure 64$_1$. As shown in FIG. 4, prior to recognition by the recognizer 58, the ink word is treated as one unitary word (e.g., the handwritten word "hand") for purposes of ink processing. In other words, the user moves the word around as a unit, deletes it as a unit, and cannot insert text in between the letters (although it is feasible to allow such an ink word to be split by the user, such as by converting the single ink word data structure into two ink word data structures each having part of the stroke data of the original ink word data structure therein). However, once the word has been recognized as text, the text buffer 62$_1$ and data structure 64$_1$ are changed as shown in FIGS. 5 and 6, respectively.

In FIG. 5, the text "hand" has been recognized as text and the most probable alternate for the handwritten data ("hand" as written out in FIG. 4). As represented in FIG. 5, upon conversion to text, the letters following the first letter, "and" are inserted into the text buffer 62$_1$. The ink word (IW1) remains the same from the perspective of most of the code that deals with the text buffers. However, the alternates handling mechanism 76 changes the ink word data structure 64$_1$, whereby the ink processor 54 displays the ink word data structure 64$_1$ differently so as to produce the correct output, i.e., only as a first, single text letter of the word. In keeping with the present invention, this enables the editing code to edit the individual characters of the word in the text buffer, without having to modify the code base to enable editing within the ink word data structure. At the same time, the stroke data and alternates information is preserved with what is serving as the first letter of the selected word.

To correctly interpret the ink word data structure, as represented in FIG. 6, the alternates handling mechanism 76 works with the aforementioned flags in the header 66$_1$ of the ink word data structure 64$_1$, the Recognized flag (ts_Recognized) which indicates whether the recognizer has returned the alternates and stored them in the ink word data structure, and the Show Recognized flag (tsShowRecognized) which indicates whether a user has converted ink to text. Note that the Recognized flag is set when the user has selected an alternate for it, as generally described in the aforementioned U.S. Patent Application entitled: "Method and System of Handling the Selection of Alternates for Recognized Words."

The ink processor 54 uses these flags to determine whether it needs to contact the recognizer 58 to obtain alternate information, and also to determine whether to display the ink word as ink or as a text letter. When the word has been recognized by the recognizer, i.e., has had the alternates information 60 returned for it, the alternates and the tail structure are "appended" to the ink word data structure 64$_1$ (actually a new copy of it). If the word is to be displayed as text, (e.g., the user has converted to text and the Show Recognized flag equals one), only the first character ("h" in the present example, stored in the tail structure 72$_1$) of the word is displayed. As represented in FIG. 5, the succeeding letters of the word ("and" in the present example using the word "hand") are inserted into the text buffer as ordinary text immediately following the ink word.

The tail structure describes the alternate information added to the ink word data structure 64$_1$, and also factors in its own data in the total size description. In general, the tail structure comprises a version code (one in the present example), two offsets, and the first letter of the chosen string. The two offsets are zero-based and indicate where in the data structure the alternate information (double null terminated string list) begins, and where in the data structure the chosen string information begins. As can be readily appreciated, it is straightforward to determine where the alternates information begins from these offsets, and because the tail structure size is known (thirty-two bytes in version one) as long as the version number can be located, which can be accomplished by leaving the version number a certain number of bytes from the end. Note that when the alternates/tail structure is essentially appended to an ink word data structure, (actually copied to a new ink word data structure with the size of the data structure in the new header modified to include this additional data).

For example, when the alternates information 60 is received, the tail structure may be initially computed by writing in an appropriate version number known to the ink processor 54, setting the first offset (and initially the second offset) to the size of the original data structure. The first letter is set to the first letter of the first string in the alternates information. The header is copied from the original data structure with a new size computed by increasing the original size by the amount of the alternate information size, plus thirty-two bytes (in version one) for the tail structure. The Recognized flag is then set, and a tail structure exists (tsTailStructureExists) flag is also set.

Note that instead of directly including the alternate information/tail structure in the (copy of the) ink word data structure, the information can be indirectly maintained, e.g., by inserting a pointer to another data structure that includes the alternates information/tail structure. The length of the ink word data structure can be increased, (e.g., by the size in bytes of the pointer), and when the tail structure exists flag is set, the ink processor 54 knows that the pointer is at the end of the ink word data structure. Such a pointer will move with the ink word.

As can be readily understood, it is straightforward to maintain the probability information with the alternates, which are null delimited. For example, each string can have exactly n bytes before or after it (but before the zero delimiter) that store the probability data for that string. Also, another delimiter could be used to separate probability data from the string data, e.g., the string followed by a null followed by the data followed by a null makes up one string choice, probability data pair. Alternatively, the tail structure could be expanded to separately describe a probability field.

Thus, in the example shown in FIGS. 4–6, once recognized and selected, the ink word storing the data for "hand" will be converted to an ink word that when displayed will appear as the letter "h" followed by the text letters "and" in the text buffer. In this manner, the ink data and alternates are preserved with the word, e.g., as the word is moved around during word processing operations. Also, the user can individually edit the characters in the word.

Because the ink data and alternates are essentially stored with the first letter of a word, if a user deletes that letter, then the ink data is lost. This is not usually significant, as the recognizer generally tends to get the first letter correct. In an alternative implementation, this information can be moved to another letter that is not deleted. For example, instead of actually deleting the first letter (as represented in the ink word data structure) from the text buffer when the user requests deletion, the second letter can instead be deleted, and the ink word data structure changed (the field that stores the first letter of the chosen string, "h" in FIG. 6), to display the second letter instead of the first. This can be repeated until the entire word is deleted, and even then, the ink word can be buffered, e.g., for an undo operation. Note that there is no reason that an edited word has to correspond to one of the alternates, or even begin with the same letter as one of the alternates.

Lastly, the ink word data structure can be modified to lose the alternates information and tail structure if no longer needed, yet remain as an ink word. For example, once a user has selected a word and saved the document, it may still be desirable to maintain the ink data, but not the alternates. In such an event, the size of the data structure in the header field is reduced based on the alternates' offset information stored in the tail structure, and the memory reclaimed.

Figure 8:
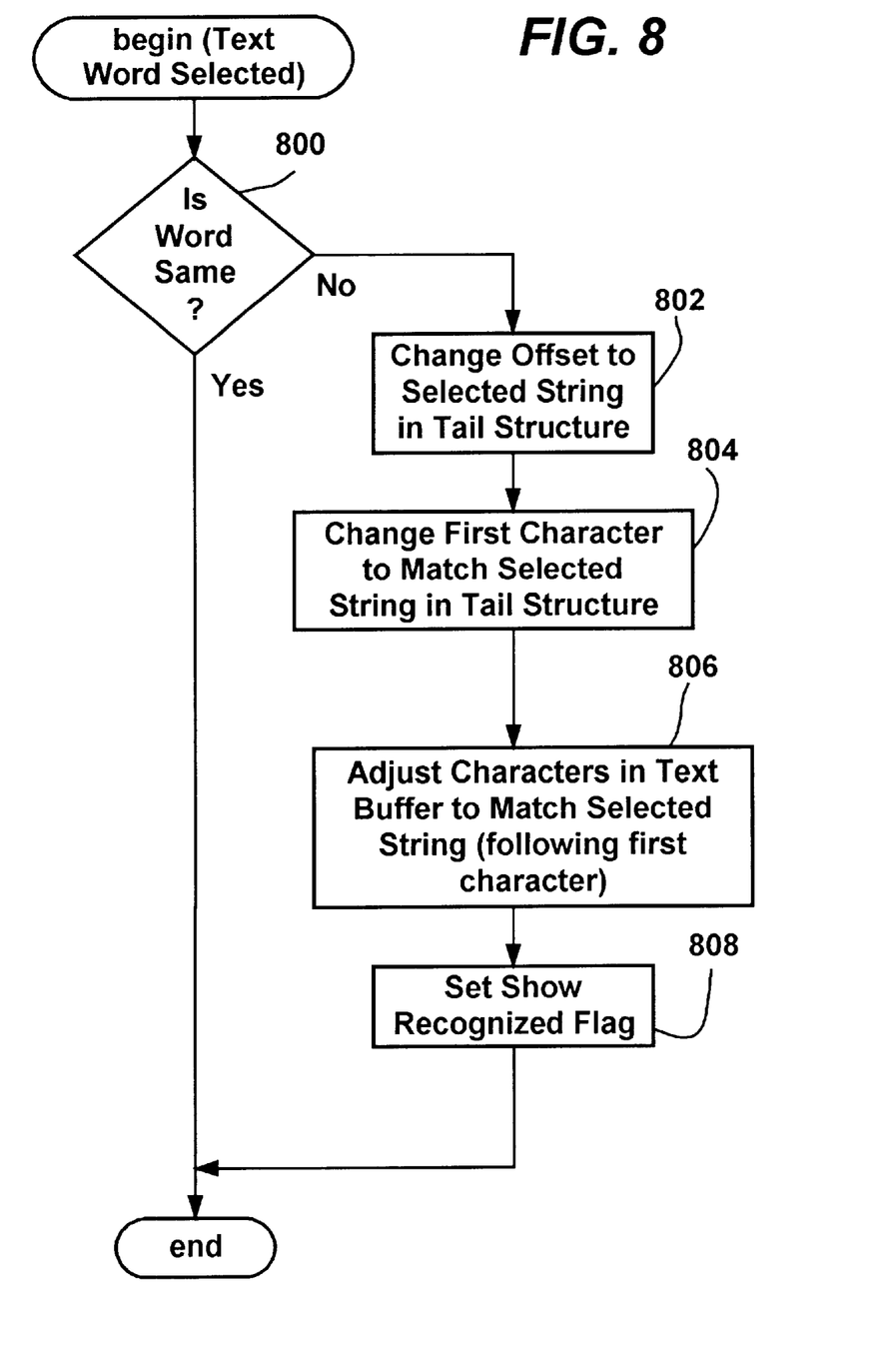
FIG. 8 is a flow diagram generally describing actions taken when a text word is selected as an alternate in accordance with one aspect of the present invention.
Figure 9:
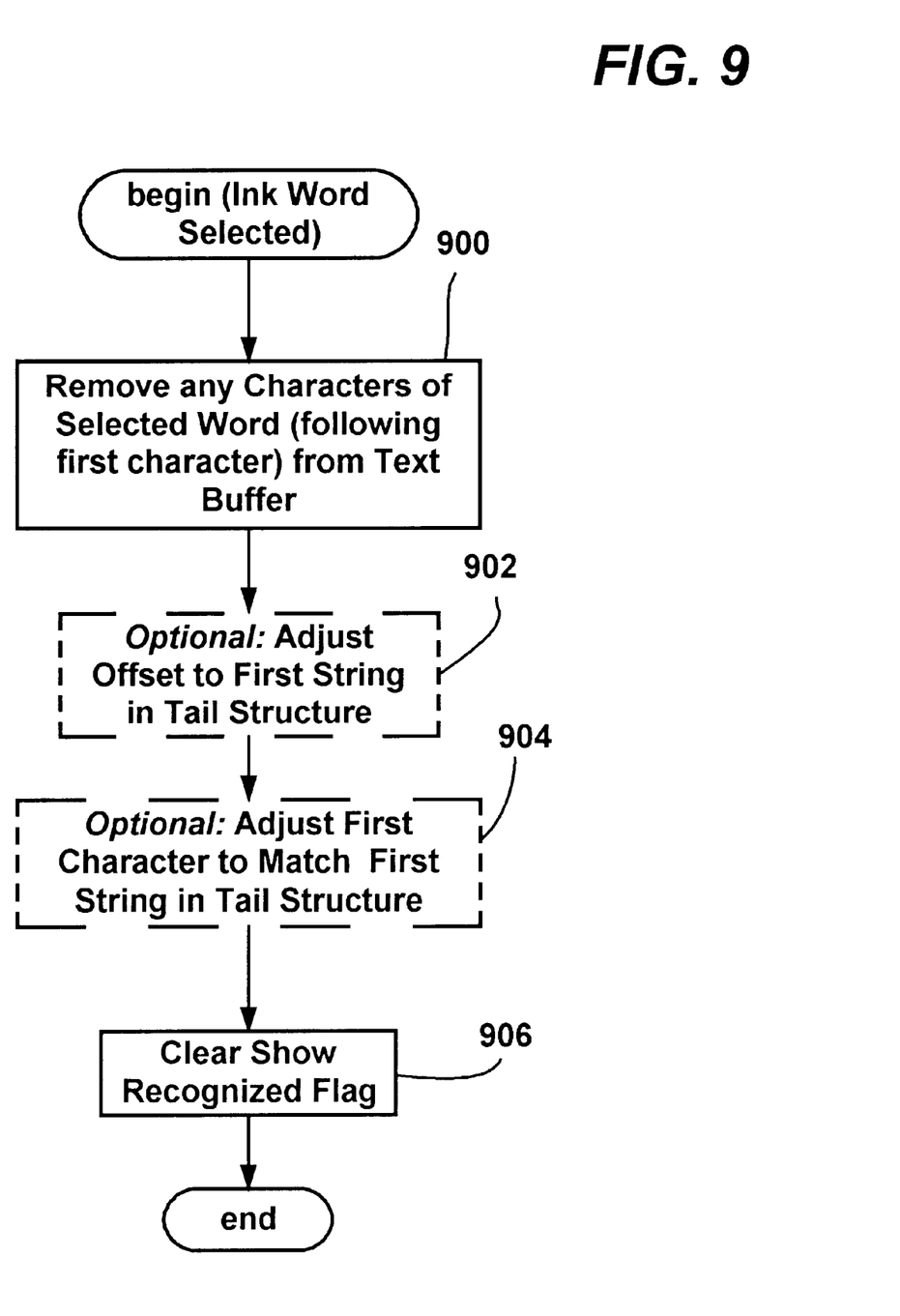
FIG. 9 is a flow diagram generally describing actions taken when handwritten ink is selected in place of a text word in accordance with one aspect of the present invention.
Figure 10:
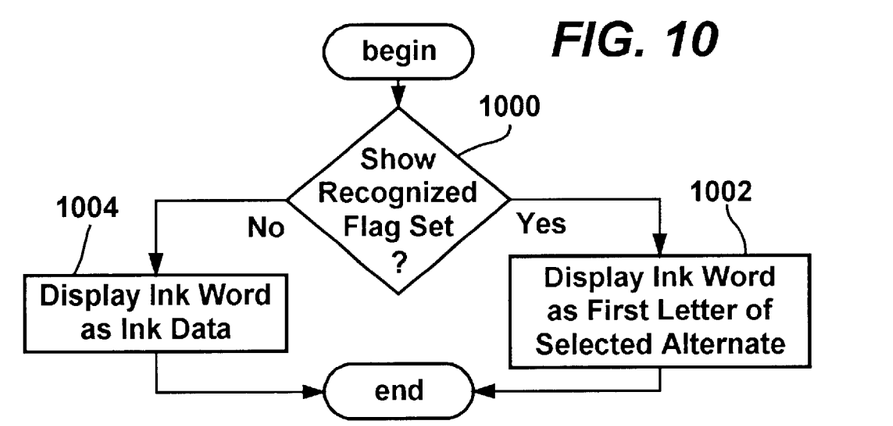
FIG. 10 is a flow diagram generally describing how the ink processor interprets an ink word data structure when updating the device display for a user.

To summarize by way of an explanation of the operation of the present invention, FIGS. 7–10 describe how the ink processor 54 handles alternates at various times, e.g., following background recognition (FIG. 7), following selection of a text alternate (FIG. 8), following selection of the ink (FIG. 9), and when interpreting an ink word data structure for outputting data to the display 26 (FIG. 10). Note that FIGS. 7–10 are simplified and only one way to manage the alternates, and that some of the steps of FIGS. 7–10 need not be in any particular order.

Figure 7:
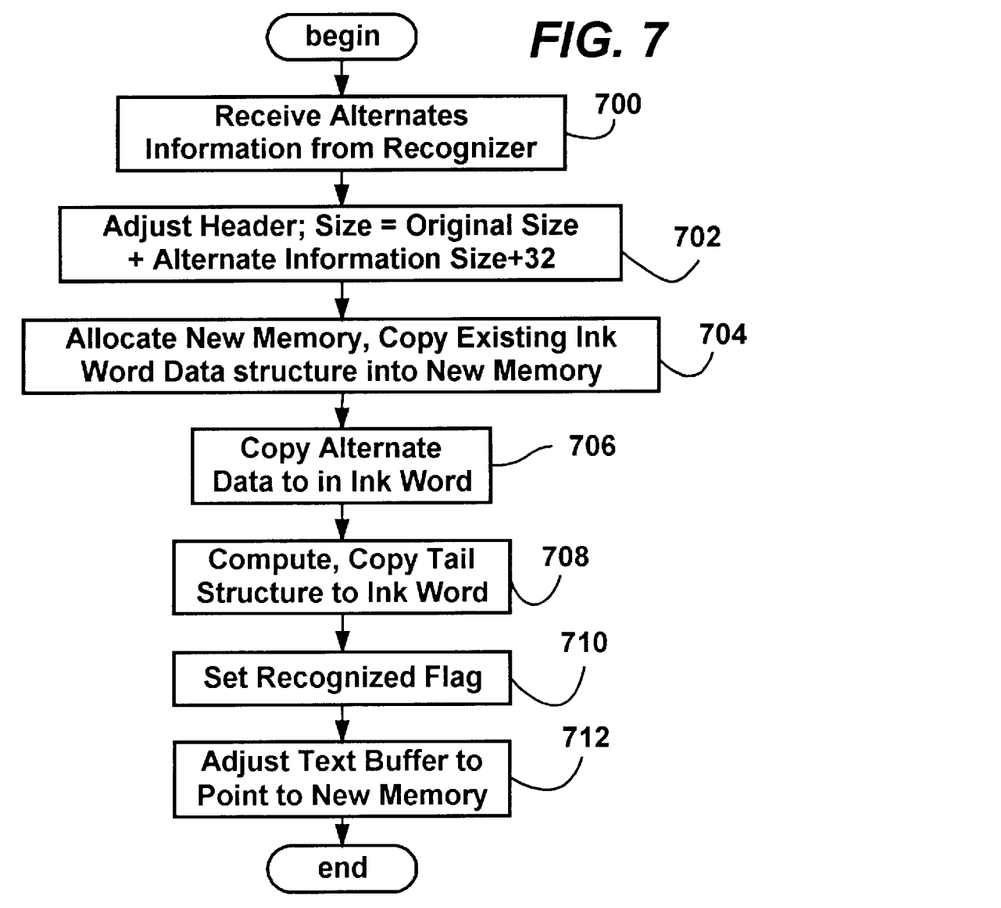
FIG. 7 is a flow diagram generally describing actions taken when alternates are received from a recognizer by the ink processor in accordance with one aspect of the present invention.

FIG. 7 begins when the word has been recognized by the recognizer 58, i.e., the alternates information 60 has been returned for at least this word as represented by step 700. Note that if the user is requesting alternates for a word that has not yet had alternates returned for it, (i.e., the Recognized flag is not set), the ink processor can first request recognition. At step 702, the size for a new ink word data structure including the original size, the alternates information size and the tail structure size is computed. At step 704, a new ink word data structure of is allocated in memory based on this new size, and the information from the original ink word data structure copied to it, (with the increased size).

The alternates information and tail structure are copied into the new ink word data structure at steps 706–708, as also described in the aforementioned U.S. Patent Application entitled "Method and System for Extending Ink Word Data Structures while Maintaining Version Compatibility." The Recognized flag is then set at step 710, and the pointer in the text buffer changed to point to this new ink word data structure (step 712).

FIG. 8 represents what may take place when the user (or some other mechanism) selects one of the text alternates returned for a given ink word. Step 800 tests whether the selection is the same as what was previously selected. More particularly, for efficiency, the tail structure may be set up to default to the most likely alternate. When the user converts the ink to text, e.g., via a Tools:Recognize command, the most likely alternate is displayed, so much of the information is already in place in the ink word data structure. Note that this situation can be tested for by checking to see if the selected string offset matches what is already stored in the tail structure. In addition to a user selecting what is in the tail structure by default, a user can also choose the same alternate that was previously selected. In such an event, the process ends.

Otherwise step 800 branches to execute steps 802 and 804, which adjust the tail structure to reflect the new selection. Steps 806 and 808 are then executed, to adjust (e.g., insert, modify or delete) the characters in the text buffer to reflect all but the first character of the text word, and to set the Show Recognized flag to indicate that the word is being converted from its handwritten form to a text form (i.e., to one of the alternates). Note that step 808 need not be performed when changing from one alternate to another, only when changing from ink to text. As can be readily appreciated, the steps of FIG. 8 thus handle conversion of an ink word to a text word, and also handle the substitution of one text word for another.

FIG. 9 represents the conversion of text back to ink, (e.g., upon user request) including the removal of any characters of the selected word (following the first character) from the text buffer at step 900. Steps 902 and 904 may be optionally executed to reset the tail structure to the most likely alternate for default purposes, although in practice, once an alternate has been selected, that alternate is preferred over any others, regardless of the one that the recognizer deemed most likely. Step 906 represents the clearing of the Show Recognized flag, such that the ink word will now be interpreted as handwritten ink, e.g., displayed in its handwritten form and treated as a unitary data block rather than separate characters for editing purposes.

FIG. 10 represents the interpretation of an ink word data structure for purposes of displaying that word to a user. If the Show Recognized flag is set at step 1000, then the tail structure of the ink word is accessed to locate the first letter of the selected alternate, and that word is output to the display as text (step 1002). Otherwise, the ink data is used to output the handwritten data to the display at step 1004.

The above description provides an efficient way to associate alternates information with an ink word, and is also beneficial because existing editing code need not be modified to work with the various structures. However, a number of alternative ways to associate alternatives are also feasible in accordance with aspects of the present invention.

A first way to handle alternates information is to leave it in the ink word data structure, insert all the characters of the word into the text buffer, and treat the ink word data structure as invisible, e.g., if the Show Recognized flag is set, ignore the ink word data structure for purposes of display. Alternatively, a special invisible text element/token can replace the ink word indicator (i.e., the symbol followed by the pointer to the ink word data structure) in the text buffer. In this embodiment, the display interpreting code will need to know how to handle the invisibility. As can be understood from the above description, this is relatively straightforward, e.g., simply by not substituting a first character when the Show Recognized flag is set (if the regular ink word indicator is used) or by skipping over the indicator and following pointer (if the special invisibility token is used). However, one drawback to these alternative embodiments is that the editing code will also have to be modified to maintain the association. For example, if the user selects and moves text, or deletes a text word, that text will need to be checked for the existence of an associated ink word data structure. This may be accomplished by always putting the ink word indicator or token in a known location in the text buffer relative to the text, e.g., directly before it, directly after it, or after the first character (which may mean that the indicator would need to be moved if the first character was deleted). Because of the need to check for the association, this embodiment is less desirable and less straightforward than storing the ink word data structure with the first character as described above.

Another way to handle alternates information is to leave it in the ink word data structure and insert none of the characters of the selected word into the text buffer. Again, the display interpreting code will need to know how to handle the ink word, (which as can be understood from the above description is relatively straightforward, simply by outputting a full selected text string instead of only the first character). Again, one drawback to this alternative embodiment is that the editing code will have to be modified to allow editing individual characters of the word. For example, if the user deletes a character, that character will have to be deleted in the ink word data structure instead of from the text buffer. Inserting and overwriting characters actually maintained within the ink word data structure will have the same issue. Thus, although also feasible, this embodiment is also less desirable and less straightforward than storing the ink word data structure with the first character of a selected alternate, as described above.

Yet another alternative is to maintain a separate table that tracks the association of characters in a text buffer with a separately maintained list of alternate information. For example, once a word is recognized, the table can record that characters A through D in a text buffer Z have a first set alternates associated with it, along with a pointer or offset to those alternates. Another table entry can record that characters I through J in the text buffer Z (or some different text buffer) have a set of alternates associated with them at some other location. As the user inserts and deletes characters in document, the table is updated to keep the character positions synchronized with the associated alternates information. As can be appreciated, maintaining such a table adds significant complexity to the editing code.

As can be seen from the foregoing detailed description, there is provided a method and system that handles the association of ink and text words with alternates information. The method and system are efficient, robust and flexible, as they maintain the alternates in association with the word yet do not lose the alternates as words are edited or change states.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computing device, a method comprising:
   receiving ink data of a first word;
   maintaining recognition state information in association with the ink data of the first word that indicates that the first word is in an unrecognized state so that additional ink or text corresponding to a second word can be received independent of when the first word is recognized; and
   upon recognition of the first word,
   a) receiving data representing a set of at least one alternate recognized as corresponding to the ink data of the first word;
   b) storing the set in association with the ink data of the first word such that the set remains associated with the ink data of the first word; and
   c) modifying the recognition state information that is in association with the ink data of the first word to indicate that the ink data of the first word has been recognized and has the set associated therewith.

2. The method of claim 1 wherein storing the set in association with the ink data includes appending information of the set to an ink word data structure that maintains information of the ink data.

3. The method of claim 1 wherein storing the set in association with the ink data includes appending a pointer to an ink word data structure that maintains information of the ink data, the pointer pointing to a data structure for storing information of the set.

4. The method of claim 1 wherein modifying the recognition state information that is in association with the ink data includes setting a flag in an ink word data structure that maintains information of the ink data of the first word.

5. The method of claim 1 further comprising, receiving information corresponding to a selected alternate of the set.

6. The method of claim 5 further comprising storing information corresponding to the selected alternate in association with the ink data of the first word such that the selected alternate remains associated with the ink data of the first word when the ink data is moved.

7. The method of claim 6 further comprising modifying information corresponding to the ink data to indicate that the ink data has a selected alternate associated therewith.

8. The method of claim 1 further comprising, determining whether the ink data of the first word has a selected alternate associated therewith, and if so, inserting information corresponding to the selected alternate into a buffer.

9. The method of claim 1 further comprising, determining that the ink data of the first word has a selected alternate associated therewith, and inserting at least some text corresponding to the alternate into a buffer.

10. The method of claim 9 wherein the selected alternate corresponds to a text word, and wherein inserting at least some text corresponding to the alternate into a buffer includes inserting text characters other than a first character of the text word into the buffer.

11. The method of claim 10 further comprising, interpreting the ink data as the first character of the text word.

12. The method of claim 1 further comprising, receiving information corresponding to a selected alternate of the set, storing information corresponding to the selected alternate in association with the ink data of the first word, and interpreting the ink data of the first word as the selected alternate.

13. The method of claim 12 wherein interpreting the ink data of the first word as the selected alternate includes displaying the ink as the selected alternate instead of in a handwritten form.

14. The method of claim 13 wherein interpreting the ink data of the first word as the selected alternate includes treating at least some of the ink data of the first word as not visible for purposes of display.

15. A computer-readable medium having computer-executable instructions which when executed perform the method of claim 1.

16. In a computing device configured to recognize handwritten words, a system comprising,
   at least one ink word data structure, each ink word data structure having data therein corresponding to a handwritten word;
   a buffer configured to maintain the locations of characters relative to the handwritten words, the buffer including an indicator and associated pointer to each ink word data structure having data therein corresponding to a handwritten word in the buffer; and
   an alternates handling mechanism, the mechanism configured to associate a set of alternates recognized for the handwritten word with the ink word data structure having data for that handwritten word, the alternates handling mechanism configured to operate in conjunction with a background recognition process without halting for user instruction, such that another handwritten word can be entered while the alternates handling mechanism operates.

17. The system of claim 16 wherein the alternates handling mechanism stores the set of alternates in an ink word data structure having data therein corresponding to the handwritten word.

18. The system of claim 17 wherein the alternates handling mechanism modifies information in a header of the ink word data structure to indicate that the set of alternates is associated therewith.

19. The system of claim 17 wherein the alternates handling mechanism receives selection of a selected alternate of the set.

20. The system of claim 19 wherein the alternates handling mechanism modifies information in the ink word data structure to identify the selected alternate within the set.

21. The system of claim 20 wherein the alternates handling mechanism inserts at least some characters corresponding to the selected alternate into the text buffer.

22. The system of claim 21 wherein the selected alternate corresponds to a text word, and wherein the alternates handling mechanism inserts characters other than a first character of the text word into the buffer.

23. The system of claim 22 wherein the alternates handling mechanism interprets the ink word data structure having an alternate selected therefore as the first character of the text word.

24. The system of claim 19 wherein the alternates handling mechanism inserts information corresponding to the selected alternate into a buffer.

25. The system of claim 19 wherein the alternates handling mechanism interprets the ink word data structure having the selected alternate to display the ink word data structure as at least one text character instead of as a handwritten word.

26. The system of claim 25 wherein the alternates handling mechanism inserts text corresponding to the selected alternate into the text buffer, and interprets the ink word data structure as invisible for purposes of display.

27. The system of claim 25 wherein the alternates handling mechanism interprets the ink word data structure as invisible by changing the indicator thereof to a token indicating invisibility.

28. The system of claim 25 wherein the alternates handling mechanism interprets the ink word data structure as invisible by determining that the ink word data structure has the selected alternate associated therewith.

29. In a computer system, a method comprising:

receiving data representing a set of alternates corresponding to ink data;

storing the set in association with the ink data such that the set is associated with the ink data;

receiving selection of a selected alternate from the set for the ink data;

storing the selected alternate in association with the ink data such that the selected alternate is associated with the ink data;

following selection of the selected alternate, interpreting the ink data as representing at least one part of the selected alternate, wherein interpreting the ink data includes, encountering a pointer to an ink word data structure containing the ink data, and locating the at least one part of the selected alternative via the pointer; and wherein locating the at least one part of the selected alternate includes locating a first text character corresponding to the selected alternate.

30. The method of claim 29, further comprising, storing at least one other part of the selected alternate as text in a buffer.

31. A computer-readable medium having computer-executable instructions which when executed perform the method of claim 29.

* * * * *